United States Patent
Chu

(10) Patent No.: US 10,819,857 B1
(45) Date of Patent: Oct. 27, 2020

(54) MINIMIZING ECHO DUE TO SPEAKER-TO-MICROPHONE COUPLING CHANGES IN AN ACOUSTIC ECHO CANCELER

(71) Applicant: Polycom, Inc., San Jose, CA (US)

(72) Inventor: Peter L. Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 16/253,770

(22) Filed: Jan. 22, 2019

(51) Int. Cl.
*H04M 9/08* (2006.01)

(52) U.S. Cl.
CPC .................................. *H04M 9/082* (2013.01)

(58) Field of Classification Search
CPC .................................................. H04M 9/082
USPC ...................................................... 379/406.08
See application file for complete search history.

(56) References Cited

U.S. PATENT DOCUMENTS

| | | |
|---|---|---|
| 5,263,019 A | 11/1993 | Chu |
| 5,305,307 A | 4/1994 | Chu |
| 5,553,014 A * | 9/1996 | De Leon, II ....... H03H 21/0012 708/322 |
| 5,600,714 A * | 2/1997 | Eppler, Jr. .............. H04B 3/23 379/390.01 |
| 5,600,718 A * | 2/1997 | Dent ...................... H04R 3/002 379/406.06 |
| 6,775,653 B1 * | 8/2004 | Wei ......................... H04B 3/23 379/406.01 |
| 10,154,148 B1 * | 12/2018 | Chu ...................... H04M 9/082 |
| 2003/0081762 A1 * | 5/2003 | Zad Issa ................ H04M 9/082 379/406.01 |
| 2008/0101622 A1 * | 5/2008 | Sugiyama ............. H04M 9/082 381/66 |
| 2009/0022074 A1 * | 1/2009 | Brox ....................... H04B 3/234 370/286 |
| 2009/0168993 A1 * | 7/2009 | Yano ....................... H04B 3/234 379/406.05 |

(Continued)

OTHER PUBLICATIONS

Hua Ye et al: "A New Double-Talk Detection Algorithm Based on the Orthogonality Theorem", IEEE Transactions on Communications, IEEE Service Center, Piscataway, NJ. USA, vol. 39, No. 11, Nov. 1, 1991 (Nov. 1, 1991), pp. 1542-1545.

(Continued)

*Primary Examiner* — Hemant S Patel
(74) *Attorney, Agent, or Firm* — Keith Lutsch, PC

(57) ABSTRACT

An endpoint receives audio from a remote endpoint. A first signal corresponding to the audio is received at an adaptive filter, and a filtered signal is generated. First audio is emitted at a loudspeaker based on the first signal. A microphone collects second audio which is based on the first audio. The microphone signal emits a signal based on the second audio. The filtered signal is subtracted from microphone signal to generate an adapted signal, the adapted signal having an energy level. The adapted signal is then transmitted to a double-talk detector, the double-talk detector configured to allow transmission of the adapted signal to the remote endpoint when the energy level of the adapted signal exceeds an energy threshold. The degree of cross-correlation between the first signal and the adapted signal is determined (iteratively). If the cross-correlation exceeds a cross-correlation threshold, the energy threshold of the double-talk detector is raised.

20 Claims, 4 Drawing Sheets

(56) References Cited

U.S. PATENT DOCUMENTS

| | | | |
|---|---|---|---|
| 2015/0163346 A1* | 6/2015 | Adams ................. | H04M 3/002 379/406.08 |
| 2015/0371657 A1* | 12/2015 | Gao ...................... | G10K 11/16 381/66 |
| 2016/0127535 A1 | 5/2016 | Theverapperuma et al. | |

OTHER PUBLICATIONS

International Search Report and Written Opinion of the International Searching Authority, PCT/US2020/014434, dated Apr. 24, 2020.

* cited by examiner

MINIMIZING ECHO DUE TO SPEAKER-TO-MICROPHONE COUPLING CHANGES IN AN ACOUSTIC ECHO CANCELER

FIELD OF TECHNOLOGY

This disclosure pertains generally to the field of acoustic echo cancellation for two-way communication, and pertains particularly to preventing echo due to speaker-to-microphone coupling changes in an acoustic echo canceler.

BACKGROUND

Acoustic echo is a problem in full duplex audio systems, such as audio conferencing or videoconferencing systems. Acoustic echo occurs when the far-end speech sent over a network comes out from the near-end loudspeaker, feeds back into a nearby microphone, and then travels back to the originating site. Talkers at the far-end location can hear their own voices coming back slightly after they have just spoken, which is undesirable. To attempt to reduce this type of echo, audio systems can use various acoustic echo cancellation techniques. Changes in speak-to-microphone coupling, such as caused by changes in microphone and/or speaker position, can subvert attempts to cancel echo. One method of adapting to changes in speak-to-microphone coupling is to employ two adaptive filters. A second adaptive filter with fewer degrees of freedom (fewer taps) and therefore faster adaptation time can be used to detect changes in the speaker-to-microphone coupling. However, any adaptive filter inherently takes some time to track changes in the speaker-to-microphone coupling, so echo would still be briefly heard with this approach. Thus, there is room for improvement in the art.

SUMMARY

A conferencing endpoint receives audio from a remote endpoint. A first signal corresponding to the audio is received at an adaptive filter, and a filtered signal is generated based on the first signal. First audio is emitted at a loudspeaker based on the first signal. A microphone collects second audio which is based on the first audio. The microphone signal emits a microphone signal based on the second audio. The filtered signal is subtracted from microphone signal to generate an adapted signal, the adapted signal having an energy level. The adapted signal is then transmitted to a double-talk detector, the double-talk detector configured to allow transmission of the adapted signal to the remote endpoint when the energy level of the adapted signal exceeds an energy threshold. The degree of cross-correlation between the first signal and the adapted signal is determined (iteratively). When the cross-correlation exceeds a cross-correlation threshold, indicating that the adaptive filter is temporarily unable to filter echo, the energy threshold of the double-talk detector is raised from a first predetermined value to a second predetermined value.

DETAILED DESCRIPTION

Figure 1:
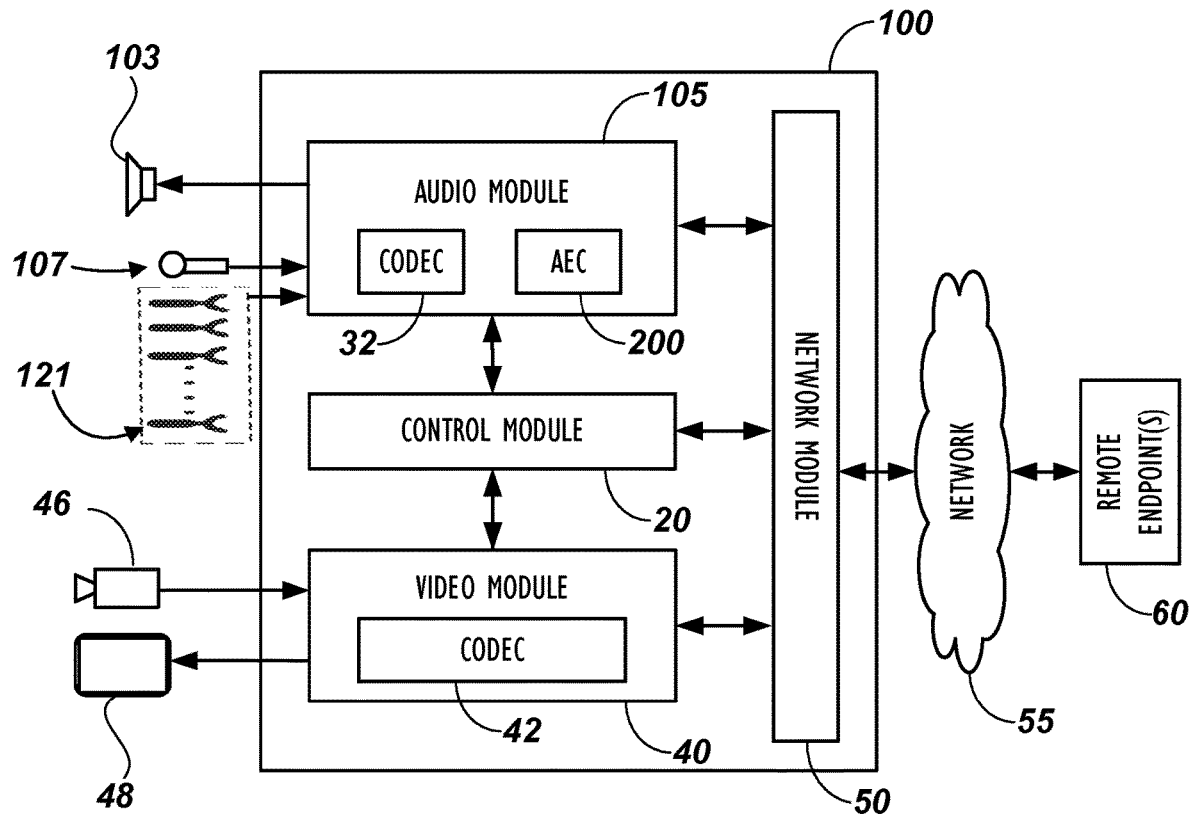
FIG. 1 illustrates a conferencing endpoint in accordance with an example of this disclosure.

Videoconferencing and teleconferencing utilize echo cancellation techniques to improve the communications experience. There are three modes of echo cancellation for such conferencing. In the first mode, when a conference participant is speaking at Endpoint A and participants at Endpoint B are not speaking, audio from Endpoint A is transmitted to Endpoint B, but audio from Endpoint B is not sent to Endpoint A. The loudspeaker at Endpoint A will not, therefore, emit audio collected from Endpoint B, and hence the speaker at Endpoint A will not hear her own voice as emitted by the loudspeaker at Endpoint B. In the second mode, a person is speaking at Endpoint B and those participants at Endpoint A are listening to that person. Here, audio is transmitted to the loudspeaker at Endpoint A, but not from Endpoint A to the loudspeaker at Endpoint B. In the third mode, participants are speaking at both endpoints. In the third mode, echo cancellation utilizes a double-talk detection unit to detect that participants are speaking at both endpoints. In the third mode, audio from Endpoint A is emitted at Endpoint B, and vice versa. This two-way transmission is generally acceptable because, although a microphone at a given endpoint will pick up audio from both the loudspeaker and from a participant speaking at the endpoint, the audio from the participant will substantially mask the audio from the near-end loudspeaker.

In at least one example of this disclosure, a double-talk detection unit compares the audio signal coming from a remote endpoint, (the far-end), with the audio signal coming from the microphone at the endpoint (near-end) If, for example, the energy of the incoming signal is high, and the energy of the microphone signal is low, then the first operating mode described in the preceding paragraph is implemented. On the other hand, if neither signal has energy which exceeds that of the other by a predetermined amount, (e.g., an absolute value or a relative percentage), then two-way talk is appropriate and the endpoint emit audio from the far-end (using a loudspeaker at the endpoint), and transmit audio picked up at the endpoint by the near-end microphone. To gain more accurate detection performance, in some examples the energy comparison is performed independently on separate regions of the frequency spectrum. For example, the energy comparison could be done independently on spectral regions of 200 Hz width. If the microphone energy exceeded the estimated loudspeaker energy for any spectral region, then it would be declared that both near-end and far-end participants were talking. For example, spectral regions can be compared in 200 Hz regions starting at about 300 Hz up to about 8000 Hz, (e.g., 300-500 Hz, 500-700 Hz, 700-900 Hz ... 7800-8000 Hz). In at least one example, double-talk can be declared as soon as it is determined that microphone energy in a spectral region exceeds a non-zero energy value in the same spectral region of the loudspeaker, and thus no additional comparisons are necessary for the double-talk "check" in question. It will be understood by those in the art that determining which endpoint is speaking or whether double-talk is present is done iteratively through a communications session.

In an example of this disclosure, an adaptive filter is used to subtract a filtered version of a near-end loudspeaker signal from a near-end microphone signal, thereby attenuating the loudspeaker signal component contained in the microphone signal. The filtered version of the loudspeaker signal mimics the loudspeaker-to-microphone coupling. The adaptive filter takes at least tens of milliseconds to adapt and provide maximum attenuation.

Occasionally the speaker-to-microphone coupling may change instantaneously. The cause of this change might movement of an object which alters the acoustic path, movement of the speakerphone, time-delay changes due to changes in audio buffer lengths, or other phenomena. A rapid change in speaker-to-microphone coupling can temporarily adversely affect a properly working double-talk detection unit. The rapid change in speaker-to-microphone coupling causes echo because the filtered loudspeaker signal no longer mimics the coupling. The adaptive filter cannot detect a change in speaker-to-microphone coupling instantaneously, thus the loudspeaker component in the microphone signal cannot be attenuated instantaneously. During a "learning time," echo is heard at the far-end in a teleconferencing call. At least one example of this disclosure is directed to detecting when changes of speaker-to-microphone coupling occurs. In at least one example, when a change of speaker-to-microphone coupling occurs, one or more thresholds are (at least temporarily) raised in post-processing/double-talk detection to prevent echo.

Under ideal conditions the adaptive filter is converged and working properly, in which case the adaptive filter will greatly attenuate the direct path of the loudspeaker to the microphone (filter out the coupled signal from the microphone). The direct path signal—the signal corresponding to the output of the loudspeaker which is captured by the microphone—is highly correlated with the loudspeaker output. Reflections from walls and non-linear components will not be attenuated as much as the loudspeaker output (which is driven by the signal received from the far-end), but these signals are not highly correlated with the signal received from the far-end). Therefore, when the adaptive filter is working as intended, the cross-correlation between the signal driving the loudspeaker and the adaptive filter's output will be lower than the cross-correlation between the signal received from the far-end and the signal coming from the microphone. Cross-correlation is a measure of similarity of two series as a function of the displacement of one relative to the other. Cross-correlation can be expressed in terms of a (cross-) correlation coefficient, ranging in value from negative one (−1) to positive one (+1).

For continuous functions $f$ and $g$, the cross-correlation can be defined as:

$$(f*g)(\tau) \triangleq \int_{-\infty}^{\infty} \overline{f(t)} g(t+\tau) dt \quad \text{(Eq. 1)}$$

For discrete functions, the cross-correlation is defined as:

$$(f*g)(\tau) \triangleq \sum_{m=-\infty}^{\infty} \overline{f[m]} g[m+n] \quad \text{(Eq. 2)}$$

On the other hand, due to a change in speaker-to-microphone coupling, if the adaptive filter is not able to match the coupling change, the direct path of the loudspeaker to the microphone will not be attenuated. The adaptive filter's output will be (at least briefly) highly correlated with the loudspeaker signal. In other words, the adaptive filter output will "look" like the loudspeaker signal; the cross-correlation between adaptive filter output and the loudspeaker signal are used as a metric of adaptive filter effectiveness. In at least one example of this disclosure, the cross-correlation can be used to determine if the adaptive filter is providing a certain level of echo attenuation. If the adaptive filter is not providing a desirable level of attenuation, seem to be working, then thresholds can be raised in subsequent signal processing to prevent echo. In at least one example of this disclosure, the loudspeaker signal and the adaptive filter output are passed through a whitening filter before the cross-correlation between the loudspeaker signal and the adaptive filter output is determined. In at least one example, a whitened the cross-correlation is used so that equal weight is given to all frequencies within a signal, which can provide more reliable detection of the cross-correlation between the loudspeaker signal and the corresponding signal coming from the adaptive filter. At least one technical advantage of using the cross-correlation between the loudspeaker signal and the adaptive filter in the manner described is that using the cross-correlation between the loudspeaker signal and the adaptive filter in the manner described enables changes in speaker-to-microphone coupling to be quickly detected and enables the effects of sudden changes in speaker-to-microphone coupling to be minimized. For example, echo that would otherwise be caused by sudden changes in speaker-to-microphone coupling can be reduced and/or prevented from being heard at the far-end.

In one or more examples of this disclosure, signal whitening includes equalizing the power or energy spectrum of a signal to be like that of a white noise signal.

FIG. 1 illustrates a conferencing apparatus or endpoint 100 in accordance with an example of this disclosure. Conferencing apparatus or endpoint 100 of FIG. 1 communicates with one or more remote endpoints 60 over a network 55. The endpoint 100 includes an audio module 105 with an audio codec 32, and a video module 40 with a video codec 42. These modules 30/40 operatively couple to a control module 20 and a network module 50. In implementations of the technology which only involve audio communication, video module 40 with a video codec 42 can be omitted.

A microphone 107 captures audio and provides the audio to the audio module 105 and codec 32 for processing. The microphone 107 can be a table or ceiling microphone, a part of a microphone pod, an integral microphone to the endpoint, or the like. Additional microphones 121 can also be provided. Throughout this disclosure all descriptions relating to microphone 107 apply to any additional microphones 121, unless otherwise indicated. The endpoint 100 uses the audio captured with the microphone 107 primarily for the conference audio. In general, the endpoint 100 can be a conferencing device, a videoconferencing device, a personal computer with audio or video conferencing abilities, or any similar type of communication device. If the endpoint 100 is used for videoconferencing, a camera 46 captures video and provides the captured video to the video module 40 and codec 42 for processing.

After capturing audio and video, the endpoint 100 encodes it using any of the common encoding standards, such as MPEG-1, MPEG-2, MPEG-4, H.261, H.263 and H.264. Then, the network module 50 outputs the encoded audio and video to the remote endpoints 60 via the network 55 using any appropriate protocol. Similarly, the network module 50 receives conference audio and video via the network 55 from the remote endpoints 60 and sends these to their respective codec 32/42 for processing. Eventually, a loudspeaker 103 outputs conference audio (received from a remote endpoint), and a display 48 can output conference video. The endpoint 100 includes a distortion detection module 199 for detecting distortion that may be introduced when the loudspeaker 103 outputs audio. Many of these modules and other components can operate in a conventional manner well known in the art so that further details are not provided here.

The endpoint 100 further includes an acoustic echo cancellation module 200 that reduces acoustic echo. Acoustic echo can result from far-end audio output by the loudspeaker 103 being subsequently picked up by the local microphone 120, reprocessed, and sent back to the far-end. Additional microphones 121 can operate by the same principle. The acoustic echo cancellation module (200) can be based on acoustic echo cancellation techniques known and used in the art to reduce or eliminate this form of echo. As will be discussed in greater detail below, the acoustic echo cancellation module 200 includes a double-talk detection unit (327), the purpose of which is to determine when persons/speakers are talking at the nearend (at endpoint 100) and people are talking at a remote endpoint 60 simultaneously. In that situation, the endpoint 100 can allow audio from the near-end and far-end to pass to the other. In simple terms, the double-talk detection unit (327) compares the energy of an audio signal received from a remote endpoint 60 with the energy in the audio signal coming from microphone 120. When the double-talk detection unit determines that the two energies are relative to one another in a predetermined relationship (for example near-end energy is twice that received from the far-end), the detection unit (327) determines that double-talk is present. That is, the detection unit (327) determines that persons at the near-end (10) and persons at the far-end are speaking substantially simultaneously. Distortion introduced by the loudspeaker 103, however, affects the performance of the double-talk detection unit, as will be discussed in greater detail below. As noted, and as will be discussed in greater detail, determining the energy corresponding to the distortion coming from loudspeaker 103 can improve the performance of one or more double-talk detection units (327) of microphones 120, 121.

Figure 2:
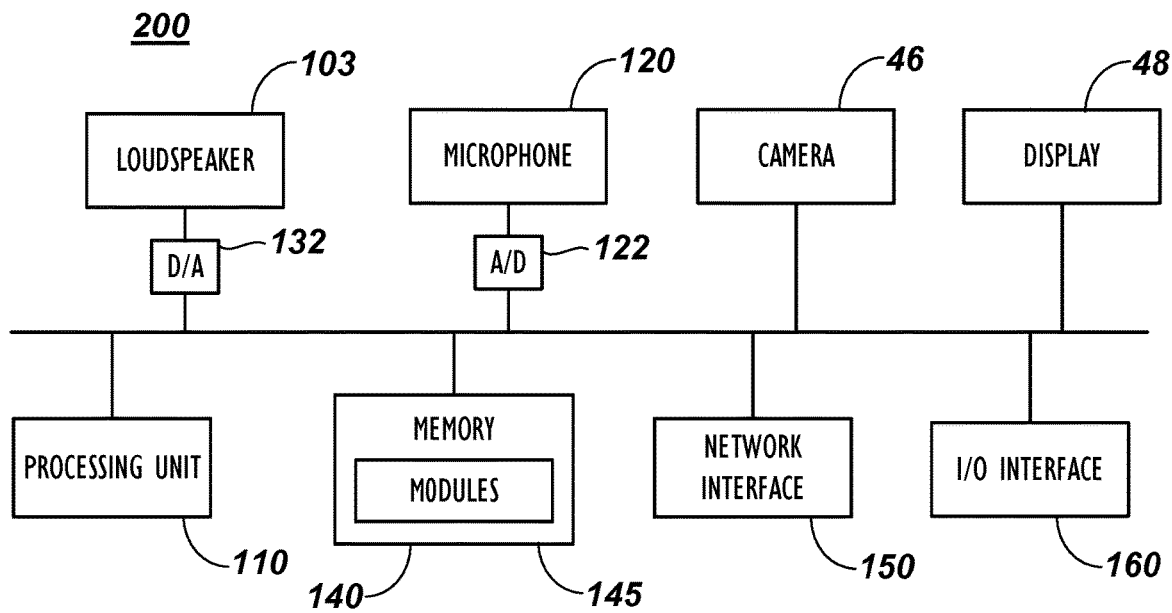
FIG. 2 illustrates components of the conferencing endpoint of FIG. 1 in detail.

FIG. 2 illustrates components of a conferencing endpoint 200 (e.g., 100) in detail. The local endpoint 200 has a processing unit 110, memory 140, a network interface 150, and a general input/output (I/O) interface 160 coupled via a bus 100. Local endpoint 200 includes base microphone 107 and loudspeaker 103, and can have the video components of a camera 46 and a display 48 if desired.

The memory 140 can be any conventional memory such as SDRAM and can store modules 145 in the form of software and firmware for controlling the local endpoint 100. The stored modules 145 include the various video and audio codecs 32/42 and other modules 20/30/40/50/200 discussed previously. Moreover, the modules 145 can include operating systems, a graphical user interface (GUI) that enables users to control the local endpoint 10, and other algorithms for processing audio/video signals.

The network interface 150 provides communications between the local endpoint 100 and remote endpoints (60). By contrast, the general I/O interface 160 can provide data transmission with local devices such as a keyboard, mouse, printer, overhead projector, display, external loudspeakers, additional cameras, microphones, etc.

During operation, the loudspeaker 103 outputs audio in the conference environment. For example, this output audio can include far-end audio received from remote endpoints via the network interface 150 and processed with the processing unit 110 using the appropriate modules 145. At the same time, the microphone 107 captures audio in the conference environment and produces audio signals transmitted via the bus 100 to the processing unit 110.

For the captured audio, the processing unit 110 processes the audio using algorithms in the modules 145. In general, the local endpoint 100 processes the near-end audio captured by the microphone 107 and the far-end audio received from the transmission interface 150 to reduce noise and cancel out acoustic echo that may occur between the captured audio. Ultimately, the processed audio can be sent to local and remote devices coupled to interfaces 150/160.

The local endpoint 100 uses the acoustic echo canceller 200 of FIG. 1 that can operate on the signal processor 110. The acoustic echo canceller 200 removes the echo signal from the captured near-end signal that may be present due to the loudspeaker 103 in the conference environment.

As shown in FIG. 2, the microphone 107 uses an analog-to-digital (A/D) converter 122 that runs off a clock 124. The loudspeaker 103 by contrast uses a digital-to-analog (D/A) converter 132. When attempting to ameliorate the effects of distortion in the loudspeaker 103 audio, digital and analog gain of each component may need to be considered.

Figure 3:
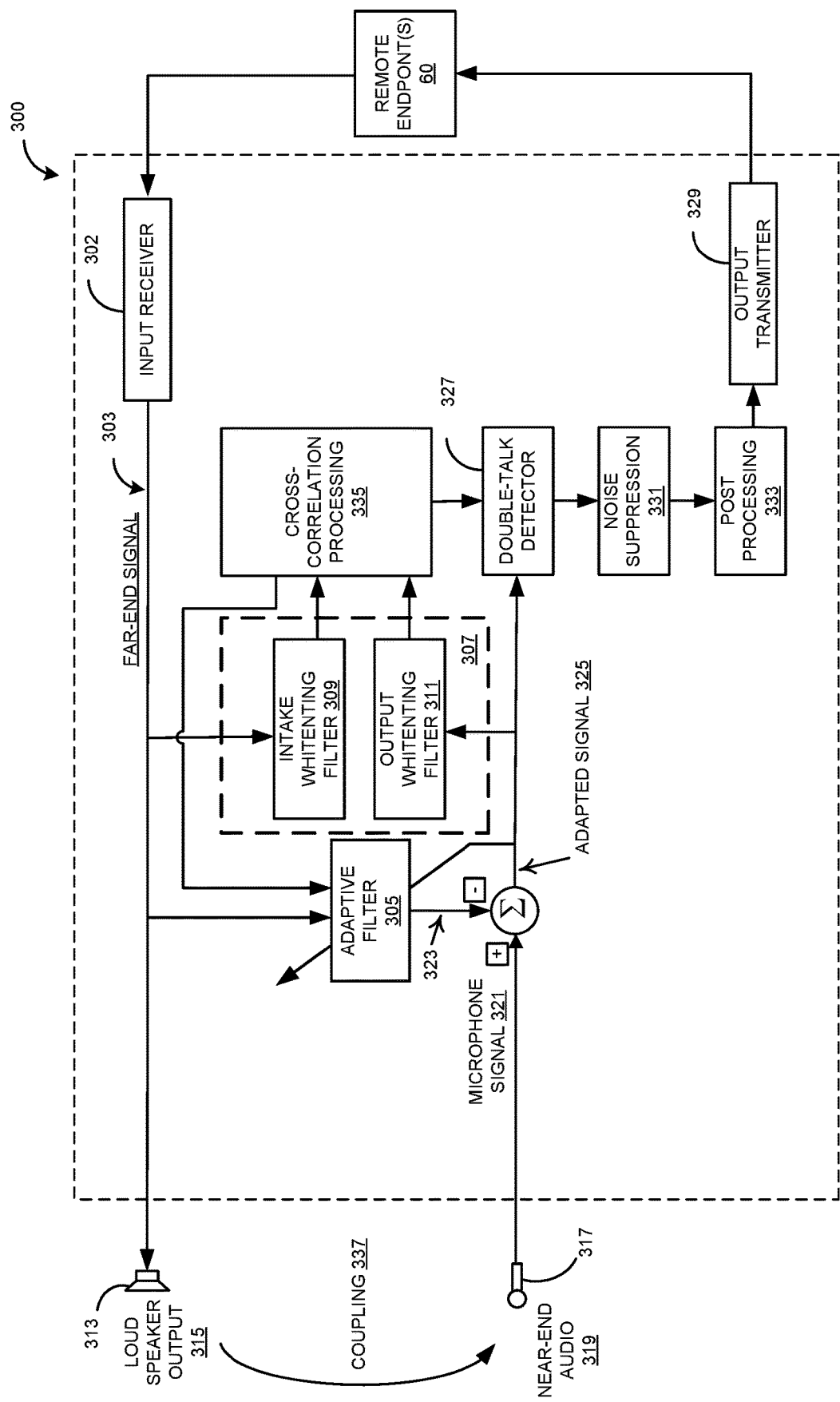
FIG. 3 illustrates a conferencing endpoint with an acoustic echo canceller and other processing components in accordance with an example of this disclosure.

FIG. 3 illustrates aspects of an endpoint 300 (e.g., 100) configured to cancel echo. One or more components illustrated can be included in echo canceller 200. A far-end signal 303 is received from a remote endpoint 60 at an input receiver 302. The far-end signal 303 is received at the adaptive filter 305 and whitening filter unit 307. In at least one example, whitening filter unit 307 can include an intake whitening filter 309 and an output whitening filter 311. In at least one example, whitening filter unit 307 is not present. Loudspeaker 313 is driven by the signal 303 from the far-end 60. Microphone 317 (e.g., 120/121) captures near-end audio 319. As noted, near-end audio can include sound emitted from the loudspeaker 315. Microphone 317 produces microphone signal 321 based on the captured audio 319. Adaptive filter 305 matches the far-end signal 303 to the microphone signal 321 and subtracts filtered signal 323 from microphone signal 321. Double-talk detector 327 determines whether the energy of the adapted signal indicates that a person is speaking at the local endpoint 300. Ideally, all artifacts of the loudspeaker output 315 are removed from the microphone signal 321 by the adaptive filter. When the energy of the adapted signal exceeds a certain threshold, such as 30 decibels, the double-talk detector will allow the adapted signal 325 to be sent to the far-end 60 by output transmitter 329, subject to other processing such as noise suppression 331 and additional post-processing 333. The cross-correlation unit 335 determines the degree of the cross-correlation between the far-end signal 303 (whitened or otherwise) and the adapted signal 325 (whitened or otherwise) coming from the adaptive filter 305. When the cross-correlation unit 335 determines that the degree of the cross-correlation between the far-end signal 303 (whitened or otherwise) and the adapted signal 325 (whitened or otherwise) indicates that the adaptive filter 305 is not screening the coupled output 315 of the loudspeaker 313 from the audio 319 captured by the microphone 317, (which can be caused by sudden changes in the speaker-to-microphone coupling 337), the cross-correlation unit 335 can adjust operation of the double-talk detector 327. As noted, the double-talk detector 327 will allow the adapted signal 325 to be sent to the far-end 60 when the energy of the adapted signal 325 meets a certain value (effectively unmuting the microphone 317). When the cross-correlation is too high, the cross-correlation unit 335 will raise the value that the double-talk will require before unmuting the microphone. In at least one example, the cross-correlation unit 335 can also alter the operation of the adaptive filter 305, at least temporarily, such as by scaling the filter signal 323 before the filter signal 323 is subtracted from the microphone signal 321.

Figure 4:
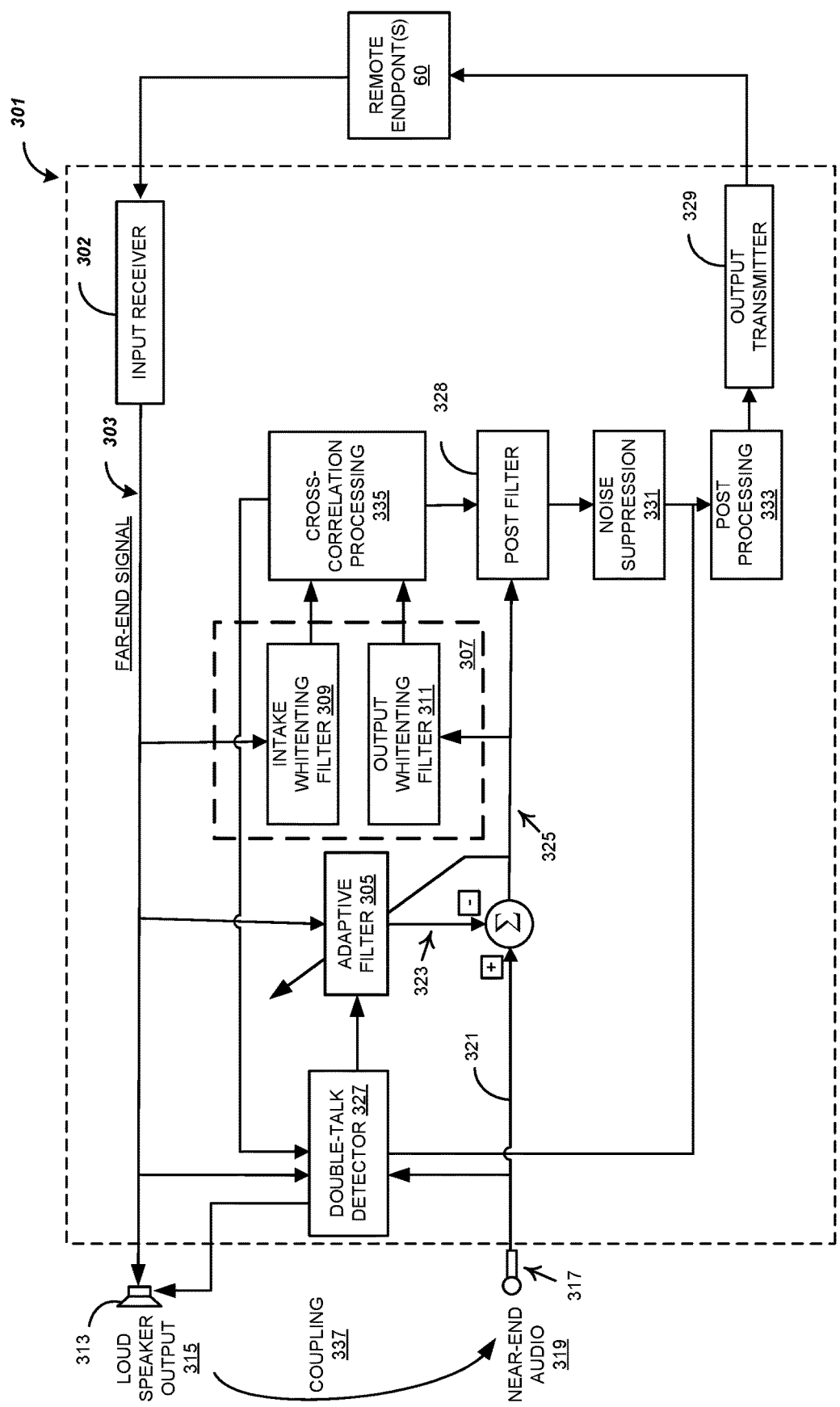
FIG. 4 illustrates a conferencing endpoint with an acoustic echo canceller and other processing components in accordance with an example of this disclosure.

FIG. 4 illustrates aspects of another example endpoint 301 (e.g., 100) configured to cancel echo. One or more components illustrated can be included in echo canceller 200. A far-end signal 303 is received from a remote endpoint 60 at an input receiver 302. The far-end signal 303 is received at the adaptive filter 305 and whitening filter unit 307. In at least one example, whitening filter unit 307 can include an intake whitening filter 309 and an output whitening filter 311. In at least one example, whitening filter unit 307 is not present. The far-end signal 303 is also received by double-talk detector 327.

Loudspeaker 313 is driven by the signal 303 from the far-end 60. Microphone 317 (e.g., 120/121) captures near-end audio 319. As noted, near-end audio can include sound emitted from the loudspeaker 315. Microphone 317 produces microphone signal 321 based on the captured audio 319. Microphone signal 321 is received by double-talk detector 327. Double-talk detector compares the energy of the received far-end signal 303 with the energy of the microphone signal. If the two signals have energy levels that are similar, the double-talk detector will determine that that people at both the far-end 60 and the near-end 301 are speaking. If the energy level of the microphone signal 321 exceeds the energy level of the far-end signal 303 by a predetermined level, the double-talk detector will determine that only a person at the local endpoint 301 is speaking, and will unmute the microphone 317 and mute the loudspeaker 315.

As in the example of FIG. 3, adaptive filter 305 matches the far-end signal 303 to the microphone signal 321 and subtracts filtered signal 323 from microphone signal 321. Ideally, all artifacts of the loudspeaker output 315 are removed from the microphone signal 321 by the adaptive filter 323. In at least one example, when the double-talk detector 327 determines that double-talk is present, the double-talk detector will temporarily disable adaptive filter 305. When the double-talk detector determines that a person is speaking at the near-end 301, the double-talk detector will allow the adapted signal 325 to be sent to the far-end 60 by output transmitter 329, subject to other processing such as noise suppression 331, post filtration 328, and additional post-processing 333. The cross-correlation unit 335 determines the degree of the cross-correlation between the far-end signal 303 (whitened or otherwise) and the adapted signal 325 (whitened or otherwise) coming from the adaptive filter 305. When the cross-correlation unit 335 determines that the degree of the cross-correlation between the far-end signal 303 (whitened or otherwise) and the adapted signal 325 (whitened or otherwise) indicates that the adaptive filter 305 is not screening the coupled output 315 of the loudspeaker 313 from the audio 319 captured by the microphone 317, (which can be caused by sudden changes in the speaker-to-microphone coupling 337), the cross-correlation unit 335 can adjust operation of the double-talk detector 327. As noted, the double-talk detector 327 will allow the microphone signal 321 to be sent to the far-end 60 when the energy of the microphone signal 321 meets a certain value (effectively unmuting the microphone 317). When the cross-correlation is too high, the cross-correlation unit 335 will raise the value that the double-talk detector 321 will require before unmuting the microphone 317. In some implementations, the adaptive filter 305 may be modified or not operated when double-talk is determined, or echo cancellation may be stopped altogether during double-talk.

Figure 5:
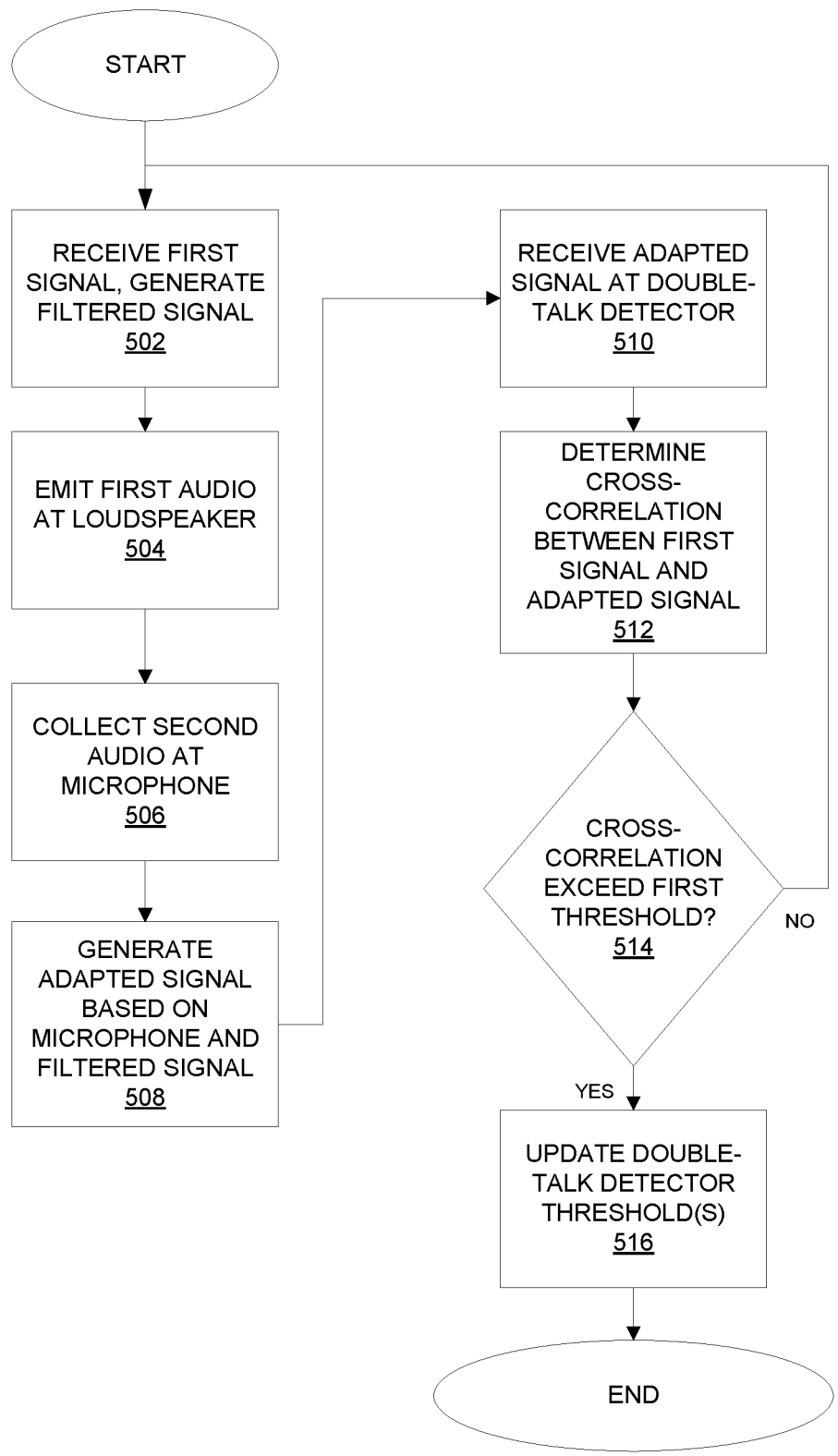
FIG. 5 illustrates an acoustic echo cancellation method in accordance with an example of this disclosure.

FIG. 5 illustrates method 500 of minimizing acoustic echo at a conferencing endpoint (e.g., 100, 200, 300, 301) in accordance with an example of this disclosure. The method starts by receiving 502 a first signal at an adaptive filter, and generating a filtered signal based on the first signal. The method 500 proceeds by emitting 504 first audio at a loudspeaker, the first audio based on the first signal. The method 500 then proceeds by collecting 506 second audio at a microphone, the second audio based on the first audio. Thereafter, the method 500 the proceeds to generate 508 an adapted signal based on the audio captured by the microphone and the filtered signal. The method 500 then proceeds by receiving 510 the adapted signal at a double talk detector, the double-talk detector configured to allow transmission of the adapted signal when the energy level of the adapted signal exceeds an energy threshold. The method 500 then determines 512 a degree of the cross-correlation between the first signal and the adapted signal. If the degree of the cross-correlation exceeds the cross-correlation threshold, the method 500 raises the energy threshold from a first predetermined value to a second predetermined value. If the degree of the cross-correlation does not exceed the cross-correlation threshold, the method 500 does not raise the energy threshold from a first predetermined value to a second predetermined value, but instead continues to receive 502 far-end signal. In at least one example, the cross-correlation threshold is between 0.35 and 0.45. In at least one example, the cross-correlation threshold is between 0.39 and 0.59. In at least one example, the cross-correlation threshold is between 0.50 and 0.85. In at least one example, the cross-correlation threshold is 0.5. In at least one example, the cross-correlation threshold is 0.6. In at least one example, the cross-correlation threshold is 0.7. In at least one example, the cross-correlation threshold is 0.8. In at least one example, the cross-correlation threshold is 0.85. In at least one example, the cross-correlation threshold is 0.89.

EXAMPLES

1. A method of minimizing acoustic echo at a conferencing endpoint comprising: receiving a first signal at an adaptive filter, and generating a filtered signal based on the first signal; emitting first audio at a loudspeaker, the first audio based on the first signal; collecting second audio at a microphone, the second audio based on the first audio; emitting, by the microphone, a microphone signal, the microphone signal based on the second audio; subtracting the filtered signal from the microphone signal to generate an adapted signal, the adapted signal having an energy level; receiving the adapted signal at a double-talk detector, the double-talk detector configured to allow transmission of the adapted signal when the energy level of the adapted signal exceeds an energy threshold; determining a degree of the cross-correlation between the first signal and the adapted signal; determining that the degree of the cross-correlation exceeds a cross-correlation threshold; and in response to determining that the degree of the cross-correlation exceeds the cross-correlation threshold, raising the energy threshold from a first predetermined value to a second predetermined value.

2. The method of example 1, further comprising: generating a first whitened signal by passing the first signal through a first whitening filter; and generating a second whitened signal by passing the adapted signal through a second whitening filter, wherein determining the degree of the cross-correlation between the first signal and the adapted signal comprises determining the degree of the cross-correlation between the first whitened signal and the second whitened signal.

3. The method of example 2, wherein the first whitening filter and the second whitening filter are different.

4. The method of example 1, further comprising: in response to determining that the degree of the cross-correlation exceeds the cross-correlation threshold, muting the loudspeaker.

5. The method of example 1, further comprising: in response to determining that the degree of the cross-correlation exceeds the cross-correlation threshold, muting the microphone.

6. The method of example 1, further comprising: in response to determining that the degree of the cross-correlation exceeds the cross-correlation threshold, blocking transmission of the microphone signal.

7. The method of example 1, wherein the first predetermined value is greater than 28 decibels and less 32 decibels, and the second predetermined value is greater than 39 decibels and less than 42 decibels.

8. A conference endpoint (e.g., 100, 200, 300, 301), comprising: an input receiver, a loudspeaker, and a microphone; a processor coupled to the input receiver, the loudspeaker, the microphone, and a memory, the memory storing instructions executable by the processor to cause the processor to: receive, through the input receiver, a first signal at an adaptive filter; generate a filtered signal using the adaptive filter, the filtered signal based on the first signal; transmit the first signal to a loudspeaker 103, and emit first audio using the loudspeaker, the first audio based on the first signal; collect second audio using a microphone, the second audio based on the first audio; emit, using the microphone, a microphone signal, the microphone signal based on the second audio; subtract the filtered signal from the microphone signal to generate an adapted signal; determine a degree of the cross-correlation between the first signal and the adapted signal; determine that the degree of the cross-correlation exceeds a cross-correlation threshold; receive the first signal and the microphone signal at a double-talk detector, the double-talk detector configured to switch to a single talk mode when a difference between the first signal and microphone signal exceeds a disparity threshold; and raise, in response to the determination that the degree of the cross-correlation exceeds the cross-correlation threshold, the disparity threshold from a first predetermined value to a second predetermined value.

9. The conference endpoint (e.g., 100, 200, 300, 301) of example 8, wherein the instructions further comprise instructions to: generate a first whitened signal by passing the first signal through a first whitening filter; and generate a second whitened signal by passing the adapted signal through a second whitening filter, and wherein the instructions to determine the degree of the cross-correlation between the first signal and the adapted signal comprise instructions to determine the degree of the cross-correlation between the first whitened signal and the second whitened signal.

10. The conference endpoint (e.g., 100, 200, 300, 301) of example 8, wherein the instructions further comprise instructions to mute the loudspeaker in response to the determination that the degree of the cross-correlation exceeds the cross-correlation.

11. The conference endpoint (e.g., 100, 200, 300, 301) of example 8, wherein the instructions further comprise instructions to mute the microphone in response to the determination that the degree of the cross-correlation exceeds the cross-correlation threshold.

12. The conference endpoint (e.g., 100, 200, 300, 301) of example 8, wherein the instructions further comprise instructions to block transmission of the microphone signal in response to determining that the degree of the cross-correlation exceeds the cross-correlation threshold.

13. The conference endpoint (e.g., 100, 200, 300, 301) of example 8, wherein the first predetermined value corresponds to a sum of an average energy of the adapted signal and ten decibels, and the second predetermined value corresponds to a sum of the average energy of the adapted signal and thirty decibels.

14. The conference endpoint (e.g., 100, 200, 300, 301) of example 8, wherein the instructions further comprise instructions to cause the processor to disable the adaptive filter for a predetermined length of time in response to the determination that the degree of the cross-correlation exceeds the cross-correlation threshold.

15. A non-transitory computer readable storage medium storing instructions executable by a processor to control a conference endpoint (e.g., 100, 200, 300, 301), the instructions comprising instructions to: receive a first signal using an input receiver; transmit the first signal to an adaptive filter, and generate a filtered signal using the adaptive filter, the filtered signal based on the first signal; transmit the first signal to a loudspeaker, and emit first audio using the loudspeaker, the first audio based on the first signal; collect second audio using a microphone, the second audio based on the first audio; emit, using the microphone, a microphone signal, the microphone signal based on the second audio; subtract the filtered signal from the microphone signal to generate an adapted signal; determine a degree of the cross-correlation between the first signal and the adapted signal; determine that the degree of the cross-correlation exceeds a cross-correlation threshold; receive the first signal and the microphone signal at a double-talk detector, the double-talk detector configured to switch to a single talk mode when a difference between the first signal and microphone signal exceeds a disparity threshold; and raise, in response to the determination that the degree of the cross-correlation exceeds the cross-correlation threshold, the disparity threshold from a first predetermined value to a second predetermined value.

16. The non-transitory computer readable storage medium of example 15, wherein the instructions further comprise instructions to: generate a first whitened signal by passing the first signal through a first whitening filter; and generate a second whitened signal by passing the adapted signal through a second whitening filter, and wherein the instructions to determine the degree of the cross-correlation between the first signal and the adapted signal comprise instructions to determine the degree of the cross-correlation between the first whitened signal and the second whitened signal.

17. The non-transitory computer readable storage medium of example 15, wherein the instructions further comprise instructions to mute the loudspeaker in response to the determination that the degree of the cross-correlation exceeds the cross-correlation.

18. The non-transitory computer readable storage medium of example 15, wherein the instructions further comprise instructions to mute the microphone in response to the determination that the degree of the cross-correlation exceeds the cross-correlation threshold.

19. The non-transitory computer readable storage medium of example 15, wherein the instructions further comprise instructions to block transmission of the microphone signal in response to determining that the degree of the cross-correlation exceeds the cross-correlation threshold.

20. The non-transitory computer readable storage medium of example 15, wherein the first predetermined value corresponds to a sum of an average energy of the adapted signal and ten decibels, and the second predetermined value corresponds to a sum of the average energy of the adapted signal and thirty decibels.

21. A method of minimizing acoustic echo at a conferencing endpoint comprising: receiving a first signal at an adaptive filter, the first signal having a first signal energy, and generating a filtered signal based on the first signal; emitting first audio at a loudspeaker, the first audio based on the first signal; collecting second audio at a first microphone, the second audio based on the first audio; emitting, by the first microphone, a first microphone signal having a microphone signal energy, the first microphone signal based on the second audio; subtracting the filtered signal from the microphone signal to generate an adapted signal; determining a degree of the cross-correlation between the first signal and the adapted signal; determining that the degree of the cross-correlation exceeds a cross-correlation threshold; receiving the first signal and the microphone signal at a double-talk detector, the double-talk detector configured to switch to a single talk mode when a difference between the first signal energy and microphone signal energy exceeds a disparity threshold; and in response to determining that the degree of the cross-correlation exceeds the cross-correlation threshold, raising the disparity threshold from a first predetermined value to a second predetermined value.

22. The method of example 21, further comprising: generating a first whitened signal by passing the first signal through a first whitening filter; and generating a second whitened signal by passing the adapted signal through a second whitening filter, wherein determining the degree of the cross-correlation between the first signal and the adapted signal comprises determining the degree of the cross-correlation between the first whitened signal and the second whitened signal.

23. The method of example 22, wherein the first whitening filter and the second whitening filter are different.

24. The method of example 21, further comprising: in response to determining that the degree of the cross-correlation exceeds the cross-correlation threshold, muting the loudspeaker using the double-talk detector.

25. The method of example 21, further comprising: in response to determining that the degree of the cross-correlation exceeds the cross-correlation threshold, muting the microphone using the double-talk detector.

26. The method of example 21, further comprising: in response to determining that the degree of the cross-correlation exceeds the cross-correlation threshold, blocking transmission of the microphone signal using the double-talk detector.

27. The method of example 21, wherein the first predetermined value is between nine and eleven decibels and the second predetermined value is between twenty-nine and thirty-one decibels.

28. A conference endpoint (e.g., 100, 200, 300, 301), comprising: an input receiver, a loudspeaker, and a microphone; a processor coupled to the input receiver, the loudspeaker, the microphone, and a memory, the memory storing instructions executable by the processor to cause the processor to: receive, through the input receiver, a first signal having a first signal energy at an adaptive filter; generate a filtered signal using the adaptive filter, the filtered signal based on the first signal; transmit the first signal to a loudspeaker 103, and emit first audio using the loudspeaker, the first audio based on the first signal; collect second audio using a first microphone, the second audio based on the first audio; emit, using the first microphone, a microphone signal having a microphone signal energy, the microphone signal based on the second audio; subtract the filtered signal from the microphone signal to generate an adapted signal; receive the first signal and the microphone signal at a double-talk detector, the double-talk detector configured to switch to a single talk mode when a difference between the first signal energy and microphone signal energy exceeds a disparity threshold; determine a degree of the cross-correlation between the first signal and the adapted signal; determine that the degree of the cross-correlation exceeds a cross-correlation threshold; and raise, in response to the determination that the degree of the cross-correlation exceeds the cross-correlation threshold, the disparity threshold from a first predetermined value to a second predetermined value.

29. The conference endpoint (e.g., 100, 200, 300, 301) of example 28, wherein the instructions further comprise instructions to cause the processor to: generate a first whitened signal by passing the first signal through a first whitening filter; and generate a second whitened signal by passing the adapted signal through a second whitening filter, and wherein the instructions to determine the degree of the cross-correlation between the first signal and the adapted signal comprise instructions to determine the degree of the cross-correlation between the first whitened signal and the second whitened signal.

30. The conference endpoint (e.g., 100, 200, 300, 301) of example 28, wherein the instructions further comprise instructions to cause the processor to mute the loudspeaker in response to the determination that the degree of the cross-correlation exceeds the cross-correlation.

31. The conference endpoint (e.g., 100, 200, 300, 301) of example 28, wherein the instructions further comprise instructions to cause the processor to mute the microphone in response to the determination that the degree of the cross-correlation exceeds the cross-correlation threshold.

32. The conference endpoint (e.g., 100, 200, 300, 301) of example 28, wherein the instructions further comprise instructions to cause the processor to block transmission of the microphone signal in response to determining that the degree of the cross-correlation exceeds the cross-correlation threshold.

33. The conference endpoint (e.g., 100, 200, 300, 301) of example 28, wherein the first predetermined value is greater than eight decibels and less than twelve decibels, and the second predetermined value is greater than twenty-five decibels and less than thirty-three decibels.

34. The conference endpoint (e.g., 100, 200, 300, 301) of example 28, wherein the instructions further comprise instructions to cause the processor to disable the adaptive filter for a predetermined length of time in response to the determination that the degree of the cross-correlation exceeds the cross-correlation threshold.

35. A non-transitory computer readable storage medium storing instructions executable by a processor to control a conference endpoint (e.g., 100, 200, 300, 301), the instructions comprising instructions to: receive, using an input receiver, a first signal having a first signal energy; transmit the first signal to an adaptive filter, and generate a filtered signal using the adaptive filter, the filtered signal based on the first signal; transmit the first signal to a loudspeaker, and emit first audio using the loudspeaker, the first audio based on the first signal; collect second audio using a first microphone, the second audio based on the first audio; emit, using the first microphone, a microphone signal having a microphone signal energy, the microphone signal based on the second audio; subtract the filtered signal from the microphone signal to generate an adapted signal; receive the first signal and the microphone signal at a double-talk detector, the double-talk detector configured to switch to a single talk mode when a difference between the first signal energy and microphone signal energy exceeds a disparity threshold; determine a degree of the cross-correlation between the first signal and the adapted signal; determine that the degree of the cross-correlation exceeds a cross-correlation threshold; and raise, in response to the determination that the degree of the cross-correlation exceeds the cross-correlation threshold, the disparity threshold from a first predetermined value to a second predetermined value.

36. The non-transitory computer readable storage medium of example 35, wherein the instructions further comprise instructions to: generate a first whitened signal by passing the first signal through a first whitening filter; and generate a second whitened signal by passing the adapted signal through a second whitening filter, and wherein the instructions to determine the degree of the cross-correlation between the first signal and the adapted signal comprise instructions to determine the degree of the cross-correlation between the first whitened signal and the second whitened signal.

37. The non-transitory computer readable storage medium of example 35, wherein the first predetermined value is greater than eight decibels and less than twelve decibels, and the second predetermined value is greater than twenty-five decibels and less than thirty-three decibels.

38. The non-transitory computer readable storage medium of example 35, wherein the instructions further comprise instructions to mute the microphone in response to the determination that the degree of the cross-correlation exceeds the cross-correlation threshold.

39. The non-transitory computer readable storage medium of example 35, wherein the instructions further comprise instructions to block transmission of the microphone signal in response to determining that the degree of the cross-correlation exceeds the cross-correlation threshold.

40. The non-transitory computer readable storage medium of example 39, wherein the first predetermined value is greater than eight decibels and less than twelve decibels, and the second predetermined value is greater than twenty-five decibels and less than thirty-three decibels.

The techniques of the present disclosure can be implemented in digital electronic circuitry, computer hardware, firmware, software, or any combinations of these. Aspects of the disclosed techniques can be implemented in a program storage device, computer-readable media, or other tangibly embodied machine-readable storage device for execution by a programmable control device. The disclosed techniques can be performed by a programmable processor executing program instructions to perform functions of the disclosed techniques by operating on input data and generating output. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other examples is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A method of minimizing acoustic echo at a conferencing endpoint comprising:
   receiving a first signal at an adaptive filter, and generating a filtered signal based on the first signal;
   emitting first audio at a loudspeaker, the first audio based on the first signal;
   collecting second audio at a microphone, the second audio based on the first audio;
   emitting, by the microphone, a microphone signal, the microphone signal based on the second audio;
   subtracting the filtered signal from the microphone signal to generate an adapted signal, the adapted signal having an energy level;
   receiving the adapted signal at a double-talk detector, the double-talk detector configured to allow transmission of the adapted signal when the energy level of the adapted signal exceeds an energy threshold;
   determining a degree of the cross-correlation between the first signal and the adapted signal;
   determining that the degree of the cross-correlation exceeds a cross-correlation threshold; and
   in response to determining that the degree of the cross-correlation exceeds the cross-correlation threshold, raising the energy threshold from a first predetermined value to a second predetermined value.

2. The method of claim 1, further comprising:
   generating a first whitened signal by passing the first signal through a first whitening filter; and
   generating a second whitened signal by passing the adapted signal through a second whitening filter,
   wherein determining the degree of the cross-correlation between the first signal and the adapted signal comprises determining the degree of the cross-correlation between the first whitened signal and the second whitened signal.

3. The method of claim 2, wherein the first whitening filter and the second whitening filter are different.

4. The method of claim 1, further comprising:
in response to determining that the energy of the microphone signal exceeds the energy of the first signal by a predetermined level, muting the loudspeaker.

5. The method of claim 1, further comprising:
in response to determining that the degree of the cross-correlation exceeds the cross-correlation threshold, muting the microphone.

6. The method of claim 1, further comprising:
in response to determining that the degree of the cross-correlation exceeds the cross-correlation threshold, blocking transmission of the microphone signal.

7. The method of claim 1, wherein the first predetermined value corresponds to a sum of an average energy of the adapted signal and ten decibels, and the second predetermined value corresponds to a sum of the average energy of the adapted signal and thirty decibels.

8. A conference endpoint, comprising:
an input receiver, a loudspeaker, and a microphone;
a processor coupled to the input receiver, the loudspeaker, the microphone, and a memory, the memory storing instructions executable by the processor to cause the processor to:
receive, through the input receiver, a first signal at an adaptive filter;
generate a filtered signal using the adaptive filter, the filtered signal based on the first signal;
transmit the first signal to a loud speaker, and emit first audio using the loudspeaker, the first audio based on the first signal;
collect second audio using a microphone, the second audio based on the first audio;
emit, using the microphone, a microphone signal, the microphone signal based on the second audio;
subtract the filtered signal from the microphone signal to generate an adapted signal;
determine a degree of the cross-correlation between the first signal and the adapted signal;
determine that the degree of the cross-correlation exceeds a cross-correlation threshold;
receive the first signal and the microphone signal at a double-talk detector, the double-talk detector configured to switch to a single talk mode when a difference between the first signal and microphone signal exceeds a disparity threshold; and
raise, in response to the determination that the degree of the cross-correlation exceeds the cross-correlation threshold, the disparity threshold from a first predetermined value to a second predetermined value.

9. The conference endpoint of claim 8, wherein the instructions further comprise instructions to:
generate a first whitened signal by passing the first signal through a first whitening filter; and
generate a second whitened signal by passing the adapted signal through a second whitening filter, and
wherein the instructions to determine the degree of the cross-correlation between the first signal and the adapted signal comprise instructions to determine the degree of the cross-correlation between the first whitened signal and the second whitened signal.

10. The conference endpoint of claim 8, wherein the instructions further comprise instructions to mute the loudspeaker in response to the determination that the energy of the microphone signal exceeds the energy of the first signal by a predetermined level.

11. The conference endpoint of claim 8, wherein the instructions further comprise instructions to mute the microphone in response to the determination that the degree of the cross-correlation exceeds the cross-correlation threshold.

12. The conference endpoint of claim 8, wherein the instructions further comprise instructions to block transmission of the microphone signal in response to determining that the degree of the cross-correlation exceeds the cross-correlation threshold.

13. The conference endpoint of claim 8, the first predetermined value corresponds to a sum of an average energy of the adapted signal and between nine and eleven decibels, and the second predetermined value corresponds to a sum of the average energy of the adapted signal and between twenty-nine at thirty-one decibels.

14. The conference endpoint of claim 8, wherein the instructions further comprise instructions to cause the processor to disable the adaptive filter for a predetermined length of time in response to the determination that the degree of the cross-correlation exceeds the cross-correlation threshold.

15. A non-transitory computer readable storage medium storing instructions executable by a processor to control a conference endpoint, the instructions comprising instructions to:
receive a first signal using an input receiver;
transmit the first signal to an adaptive filter, and generate a filtered signal using the adaptive filter, the filtered signal based on the first signal;
transmit the first signal to a loudspeaker, and emit first audio using the loudspeaker, the first audio based on the first signal;
collect second audio using a microphone, the second audio based on the first audio;
emit, using the microphone, a microphone signal, the microphone signal based on the second audio;
subtract the filtered signal from the microphone signal to generate an adapted signal;
determine a degree of the cross-correlation between the first signal and the adapted signal;
determine that the degree of the cross-correlation exceeds a cross-correlation threshold;
receive the first signal and the microphone signal at a double-talk detector, the double-talk detector configured to switch to a single talk mode when a difference between the first signal and microphone signal exceeds a disparity threshold; and
raise, in response to the determination that the degree of the cross-correlation exceeds the cross-correlation threshold, the disparity threshold from a first predetermined value to a second predetermined value.

16. The non-transitory computer readable storage medium of claim 15, wherein the instructions further comprise instructions to:
generate a first whitened signal by passing the first signal through a first whitening filter; and
generate a second whitened signal by passing the adapted signal through a second whitening filter, and
wherein the instructions to determine the degree of the cross-correlation between the first signal and the adapted signal comprise instructions to determine the degree of the cross-correlation between the first whitened signal and the second whitened signal.

17. The non-transitory computer readable storage medium of claim 15, wherein the instructions further comprise instructions to mute the loudspeaker in response to the determination that the energy of the microphone signal exceeds the energy of the first signal by a predetermined level.

18. The non-transitory computer readable storage medium of claim 15, wherein the instructions further comprise instructions to mute the microphone in response to the determination that the degree of the cross-correlation exceeds the cross-correlation threshold.

19. The non-transitory computer readable storage medium of claim 15, wherein the instructions further comprise instructions to block transmission of the microphone signal in response to determining that the degree of the cross-correlation exceeds the cross-correlation threshold.

20. The non-transitory computer readable storage medium of claim 15, wherein the first predetermined value corresponds to a sum of an average energy of the adapted signal and from eight to eleven decibels, and the second predetermined value corresponds to a sum of the average energy of the adapted signal and from twenty-nine to thirty-two decibels.

* * * * *